US006191794B1

(12) United States Patent
Priem et al.

(10) Patent No.: US 6,191,794 B1
(45) Date of Patent: Feb. 20, 2001

(54) METHOD AND APPARATUS FOR SCALING TEXTURE MAPS FOR GRAPHICAL IMAGES

(75) Inventors: Curtis Priem, Fremont; David Schmenk, Palo Alto; David Kirk, San Francisco, all of CA (US)

(73) Assignee: NVidia Corporation, Santa Clara, CA (US)

( * ) Notice: Under 35 U.S.C. 154(b), the term of this patent shall be extended for 0 days.

(21) Appl. No.: 09/057,062

(22) Filed: Apr. 8, 1998

(51) Int. Cl.[7] ................................................. G06T 11/40
(52) U.S. Cl. ............................................. 345/430; 345/428
(58) Field of Search ..................................... 345/428, 430

(56) References Cited

U.S. PATENT DOCUMENTS 5,471,572 * 11/1995 Buchner et al. ..................... 345/439
5,949,425 * 9/1999 Willis ................................... 345/428
5,986,663 * 11/1999 Wilde ................................... 345/428

* cited by examiner

*Primary Examiner*—Mark R. Powell
*Assistant Examiner*—Motilewa Good-Johnson
(74) *Attorney, Agent, or Firm*—Oppenheimer, Wolff & Donnelly, LLP; Claude A. S. Hamrick (57) ABSTRACT

A method which derives for each triangle to be rendered the values of the texture map coordinates in world space and the screen space two dimensional coordinates across the polygon, utilizes the values to provide two bounding boxes, compares the values of sides of the bounding boxes, and uses these comparisons to select a texture map of a scale which will provide an accurate color representation of a texture value for the pixels of the polygon.

15 Claims, 5 Drawing Sheets

METHOD AND APPARATUS FOR SCALING TEXTURE MAPS FOR GRAPHICAL IMAGES

BACKGROUND OF THE INVENTION

1. Field of the Invention

This invention relates to computer systems, and more particularly, to methods and apparatus for selecting a scale for a texture map used in applying texture to computer output images.

2. History of the Prior Art

In three dimensional graphics, surfaces are typically rendered by assembling a plurality of polygons in a desired shape. The polygons are conventionally triangles having vertices which are defined by three dimensional coordinates in world space, by color values, and by texture coordinates among other values. The three dimensional coordinates are translated into screen coordinates in which horizontal and vertical values (x, y) define screen position and a depth value z determines how near a vertex is to the screen and thus whether and how that vertex is viewed with respect to other points at the same screen coordinates. The color values define the brightness of each of red/green/blue (r, g, b) colors at each vertex and thus the color at each vertex. The texture coordinates (u, v) define the coordinates of each vertex on a texture map defined by values stored in memory.

A texture map describes a pattern to be applied to the surface of the triangle to vary the color in accordance with the pattern. A texture map is a matrix of values which describe colors at intersections of a pair of integral texture coordinates. The placement of the values in the matrix describes a pattern which when applied to the surface of the triangle varies the colors in accordance with the pattern. Since the texture coordinates of the vertices of a triangle define the position of the triangle on the texture map, the texture coordinates determine the texture applied to each portion of the triangle. In turn, the three dimensional world space coordinates of the vertices of a triangle positioned on the texture map define the plane in which the texture map lies with respect to the screen surface. Other characteristics defining each vertex such as transparency and additional textures may also be included to provide more sophisticated rendering.

In order to provide the pixel data to be stored in a frame buffer by which a triangle may be drawn on the screen, the screen vertices of the particular triangle are first determined from the world space three dimensional coordinates. Determining the vertices of a triangle in screen space fixes the position of all of the pixels defining that triangle in screen space. Once the pixels are determined defining the triangle in screen space, the depth values, the color values, and the texture coordinates are determined across the surface of the triangle in world space and projected onto screen space so that these values are known for each pixel. Since the triangle lies in a plane in world space, the depth, color values, and texture coordinates vary linearly in world space within the triangle from one to the other of the vertices. The depth values, color values, and texture coordinates in world space are projected into screen space by a process termed perspective projection. Then, the texture coordinates are utilized to determine texture values from a particular texture map; and these texture values are utilized to modify the color values of each pixel in the triangle.

The texture coordinates u and v of each pixel provide an index into a map of texture values typically stored in memory which together describe a particular texture pattern that is to be applied to the surface of the triangle. If a texture map describes a brick wall, for example, then each individual screen pixel in the triangle covers some portion of the texture map; and a texture value may be derived using the u and v coordinates of the pixel; and this texture value reflects the texture of the brick wall at the portion of the map where that pixel lies. This texture value is then used to modify the r, g, b color values determined by interpolation and perspective projection for that pixel.

Texture coordinates obtained by the interpolation and perspective projection processes are not typically integer values. On the other hand, indexing into a texture map is accomplished using integral coordinates. Consequently, non-integral coordinates must somehow be used to obtain texture values. A simple method of obtaining texture values uses the closest integral u and v values for each pixel to index into the texture map and then selects the value at that intersection.

This simple method does not provide a very accurate representation of texture values. This may be better understood by considering the relationship of texels and pixels. A pixel defines a position at which a single color is placed to display one position in a triangle. A texel represents a single value which may be used with other values to determine which single color a pixel displays. If a pixel covers a number of texels, then many different texels should be evaluated to determine a final color for the pixel. If a pixel covers approximately one texel, then that texel might be the only texel considered in determining the color for that pixel. Consequently, if only a single texture value is used to determine the texture value for a pixel, the determination will not be correct in all instances.

A more accurate method of representing the texture pattern representing a pixel is a process called bilinear interpolation which utilizes the integer portion of the u and v coordinates to select four sets of integral coordinates surrounding the center of each pixel at which to index into a texture map. For each of the texture values determined, the method uses the fractional portion of the coordinates to weight the texture value (texel). These weighted portions (typically the four texture values closest to the intersection) are combined and blended into a more accurate representation for modifying the pixel color values to reproduce the texture pattern. This provides a more accurate representation of texture where a number of texels are covered by a pixel.

However, those skilled in the art have recognized that where a pixel covers a very large number of texture values on a texture map, only a small portion of those values will be represented in the texture value selected to modify the color of that pixel using the bilateral interpolation method just described. Consequently, a more accurate method of texture mapping has been devised. The method provides texture maps having a plurality of different scales covering the same textures. A texture map may be selected having a scale such that the pixels of the individual triangles cover relatively consistent numbers of texels. The process of selecting a texture value for a pixel then includes an initial step for each particular triangle being rendered in which a texture map is selected having a scale adapted to accurately represent textures for the pixels of that triangle. The conventional process by which scaling is accomplished is referred to as "mipmapping." The mipmapping process is described in a paper entitled "Pyramidal Parametrics," presented at Siggraph proceedings, 1984.

In order to make the scale selection process more accurate, an additional process by which texture maps of the two closest scales to a desired scale are selected, and the texture values provided by those two different texture maps are interpolated linearly to provide values closer to the desired scale. This process is often referred to as "trilinear mipmapping."

The mipmapping process provides relatively accurate scaling for rendering pixels on the screen if the triangle lies in a plane parallel to the screen surface. However, since the process assumes that the projection of a pixel onto the texture map is square or rectangular in shape and aligned to the same axes as the texture map, the process does not provide a correct estimate of the number of texels covered by a pixel especially if the vertices of the triangle being mapped are at significantly different depths so that the triangle is foreshortened by perspective and the pixels on any scan line projected into texture space are warped and of different sizes and shapes. To obtain a correct texture scale, a method must be capable of accurately describing the actual size of the warped and distorted shapes of pixels which are projected into texture space when three dimensional shapes are rendered in any significant perspective in two dimensional space.

It is desirable to provide a method for determining the scale to be used for a texture map for more realistically mapping texture values to pixels representing three dimensional shapes than has been possible with prior art methods.

SUMMARY OF THE INVENTION

This and other desirable results of the present invention are realized by a method which derives for each triangle to be rendered the values of the texture map coordinates in world space and the screen space two dimensional coordinates across the polygon, utilizes the values to provide two bounding boxes, compares the values of sides of the bounding boxes, and uses these comparisons to select a texture map of a scale which will provide an accurate color representation of a texture value for the pixels of the polygon.

These and other objects and features of the invention will be better understood by reference to the detailed description which follows taken together with the drawings in which like elements are referred to by like designations throughout the several views.

DETAILED DESCRIPTION

Figure 1:
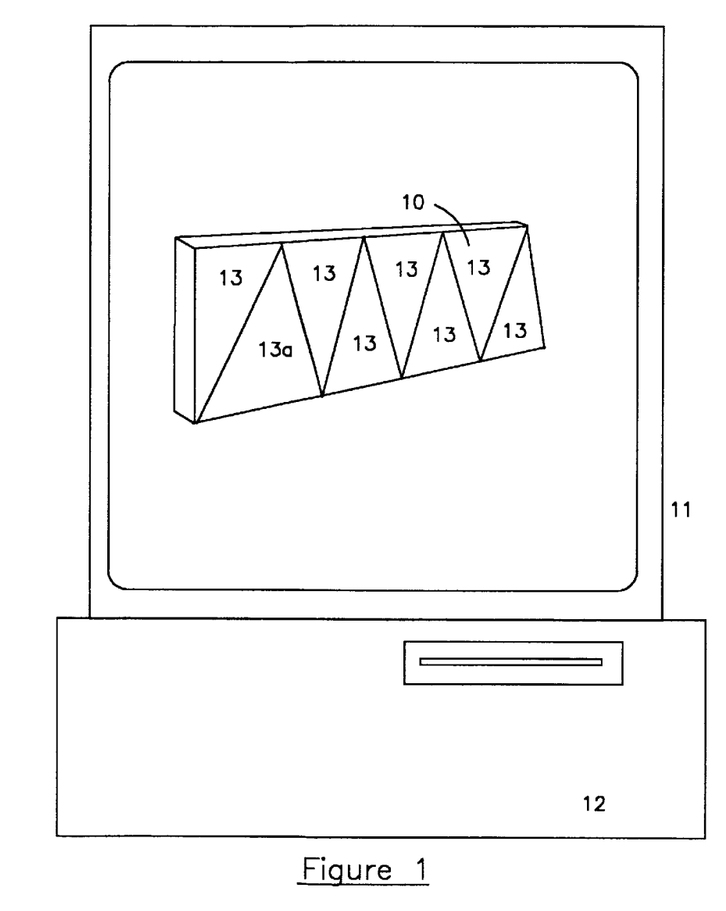
FIG. 1 illustrates a shape rendered on a computer display utilizing polygons.

FIG. 1 illustrates a three dimensional object having a surface 10 displayed on an output display 11 of a computer 12. The surface 10 is typically described by a plurality of polygons 13 which are usually triangles. The use of a plurality of polygons 13 allows a variegated surface to be described by relatively simple approximations of individual areas of the surface 10. The screen projection of one of these polygons 13a (also referred to as triangle 13a) has been enlarged in FIG. 2 in order to illustrate the manner in which it and the other polygons are rendered in order to produce the surface 10.

It will be assumed for the purpose of this specification, that the surface 10 is some form of three dimensional multicolored textured surface. As may be seen, the triangle 13a which is a part of the surface 10 includes the usual three vertices each of which is typically defined by screen coordinates x, y, z; color values r, g, b; and texture coordinates u, v. Typically, the x, y, and z values assigned in an application program define the position of each vertex in some general world space. The world space coordinates are translated during the rendering process to screen space by algorithms of linear interpolation and perspective transformation processes so that each vertex is positioned at some x distance along a horizontal screen axis and some y distance along a vertical screen axis. Once the vertices are defined in screen space, the position of the triangle is fixed in screen space so that the pixels which describe the triangle may be accurately ascertained.

The z value may be retained in a "z" or depth buffer or otherwise used to compare to the z values of other pixels which are mapped to the same x and y screen coordinates in order to determine which pixel is nearer the front of the screen and should therefore be shown (or assume some other frontal precedence). It should be noted that when the z values for each of the vertices are the same, the triangle lies in a plane parallel to the screen surface and is undistorted. However, if the z values of the vertices differ, then the triangle is rendered on the screen in perspective which may or may not be apparent depending on the other screen elements displayed simultaneously. The color values r, g, and b define the brightness of each of the red, green, and blue colors at each vertex. In the absence of texture mapping, if the color values are all the same at each of the vertices, then the entire triangle 13a is of a single solid color. In the absence of texture mapping, if any of the color values is different at the three vertices, then the color of the triangle 13a varies across its surface.

Figure 2:
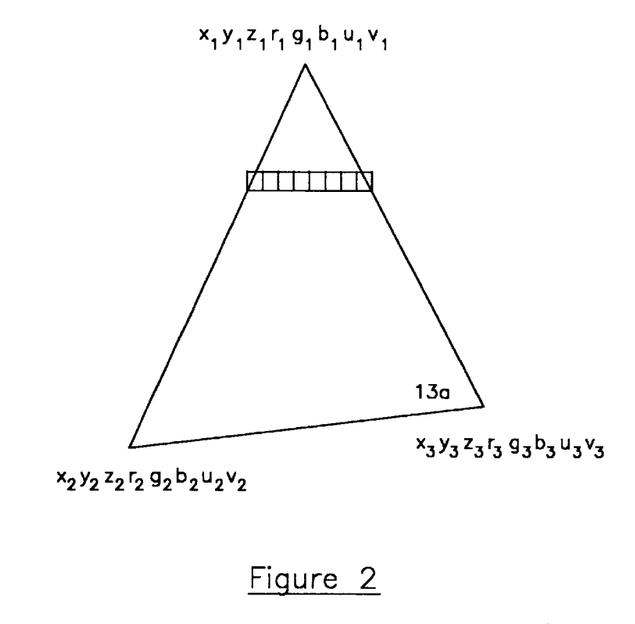
FIG. 2 is an enlargement of one of the polygons illustrated in FIG. 1.

In order to provide the data to be stored in a frame buffer by which a triangle 13a may be drawn on the screen, the screen coordinates of the vertices of the particular triangle are first determined from the world space three dimensional coordinates by a process of perspective projection. In effect, a view point for the eye is positioned in front of the screen at some defined distance; and straight lines from that eye position to each of the vertices of the triangle in world space determine the X and Y coordinates of each vertex in screen space. Once the vertices of a triangle have been defined in screen space, the individual pixels defining each triangle are determined by positioning the triangle in screen space using the known values at the vertices. FIG. 2 illustrates a scan line of pixels in screen space which described a portion of the triangle. Each pixel defining the triangle must be assigned a depth value, color values, and texture coordinates from the world space values. Since the triangle lies in a plane in world space, the depth values, the red, green, and blue color values, and the texture coordinates assigned at each of the three vertices each individually vary linearly from vertex to vertex. Consequently, a linear interpolation process may be used to find the depth values, color values, and the texture coordinates in world space for any position in the triangle. The depth values, color values, and texture coordinates in screen space for each pixel in the triangle are then determined by applying perspective divide and projection algorithms to the values arrived at by linear interpolation of the world space depth values. Once the depth value, color values, and texture coordinates in world space are then projected into screen space by the process of perspective projection so that these values are known for each pixel. It has been found possible to accomplish all of these operations for each pixel in the triangle in a single operation which is referred to as hyperbolic interpolation.

Once projected into screen space, the texture coordinates are utilized to determine texture values from the texture map; and these texture values are utilized to modify the color values at each pixel in the triangle.

Figure 3:
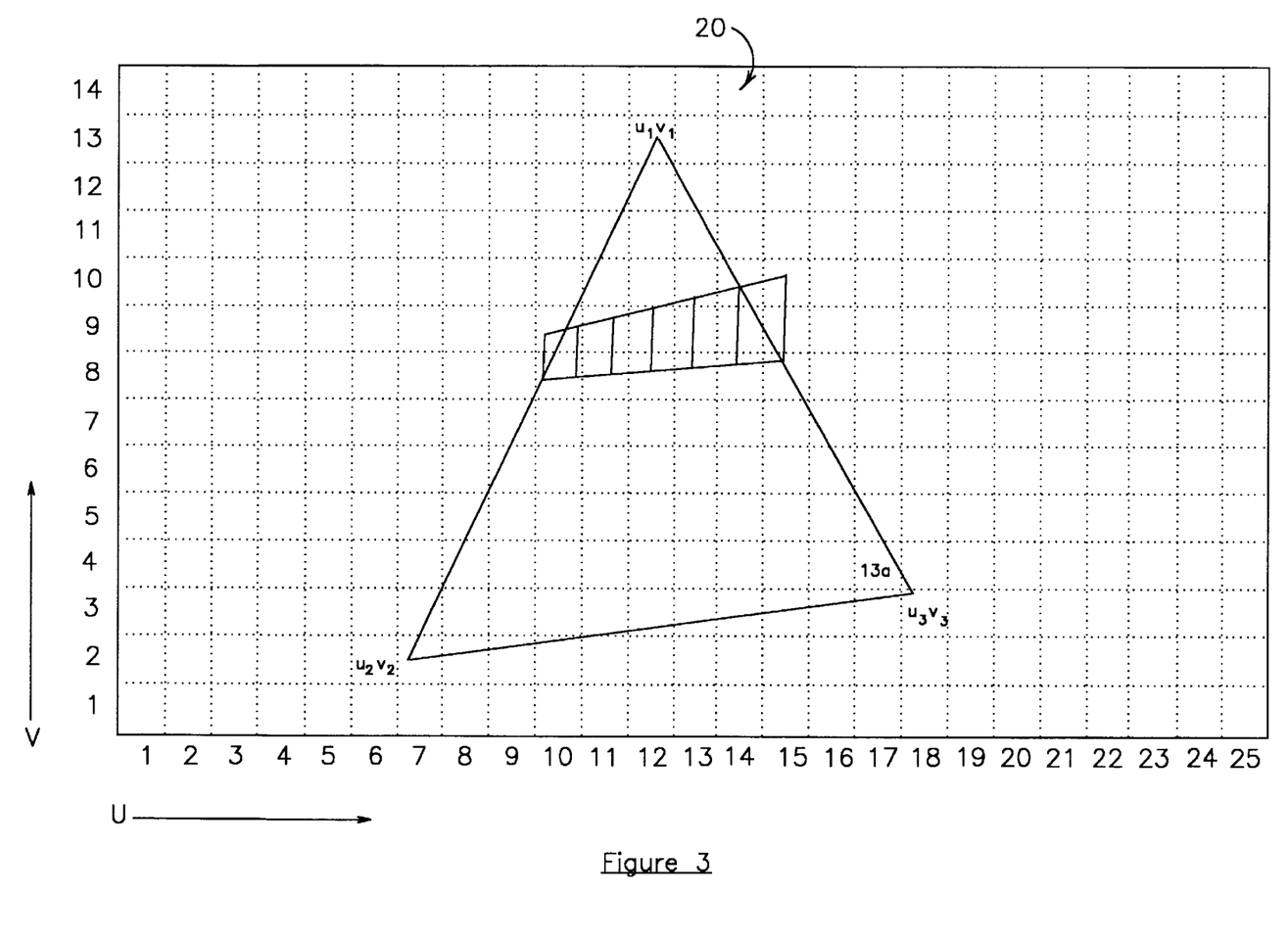
FIG. 3 illustrates the mapping of a polygon such as that illustrated in FIGS. 1 and 2 onto a texture map used to modify colors for shapes displayed on a computer display.
Figure 4:
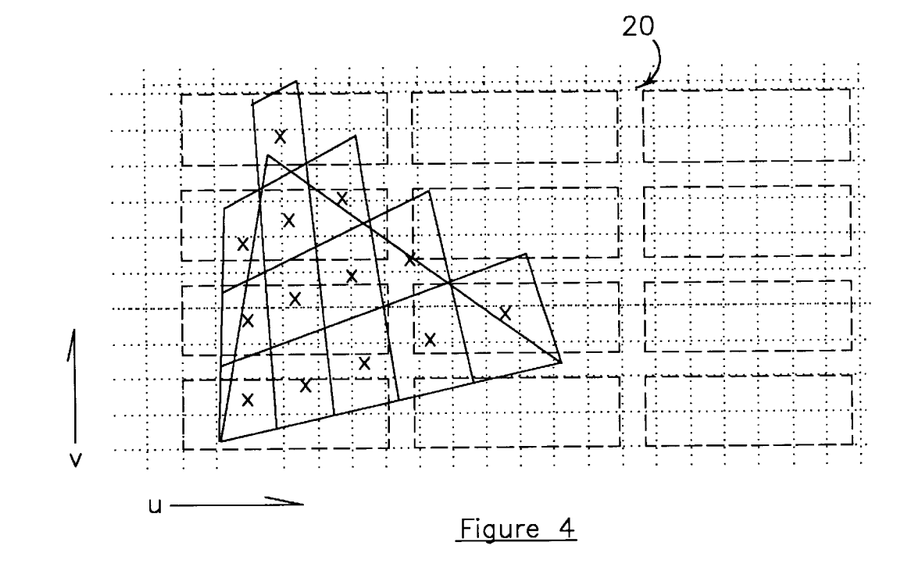
FIG. 4 is an enlargement of a portion of the texture map illustrated in FIG. 3.

The texture coordinates u and v of each vertex provide an index into a texture map (typically stored in memory) for a particular texture pattern which is described on the surface of the triangle 13a. FIG. 3 illustrates (in world space) such a texture map 20 from which texture values may be determined using the texture coordinates u and v provided for each vertex. The u and v coordinates provide access to a matrix of texture values which are illustrated by the dotted boxes of FIG. 3. In FIG. 3, the three sets of texture coordinates u and v are utilized to position the triangle 13a on the texture map 20 which shows texels as dotted rectangles. Solid lines illustrate the single scan line of pixels shown in FIG. 2 projected into world space onto the texture map. As may be visualized, if a texture map describes a brick wall, for example, then each individual screen pixel covers some portion of the texture map 20 and may be used to derive from that portion a value which when applied to modify the color values r, g, b for that pixel causes the surface of the triangle 13a to reflect the brick texture of the texture pattern 20. This is better illustrated in FIG. 4 in which the texels of the texture map are outlined by dotted lines, the projected pixels describing the triangle are outlined by solid lines, and a brick texture of the map in shown in dashed lines.

The u and v values which have been determined by the linear interpolation and perspective projection processes are not usually integer values. On the other hand, indexing into a texture map is accomplished using integral coordinates. Consequently, non-integral texture coordinates obtained by interpolation must somehow be used to obtain texture values. It is a complicated problem to derive texture values which accurately describe the texture at each pixel which covers the texture map. There are a number of methods used in the prior art to derive texture values from the u and v texture coordinates. A simple method uses the closest integral u and v values of each pixel to index into the texture map and then selects the value at that intersection. The closest integral values may be selected by rounding or truncating the u and v coordinates. As may be seen in FIG. 4 which is a view of a triangle positioned on a texture map in world space, this may cause a selection of texture values from the texture map which do not represent the texture well. The "x's" are each centered within the solid lines which depict a pixel projected into world space. If these "x's" are used to provide a texture value from the dotted lines indicating texels, the particular texels in which each "x" happens to fall does not necessarily produce the pattern of the texture very faithfully.

A more accurate method of representing the texture pattern called bilinear interpolation utilizes the integer portion of the u and v values determined for each pixel to index into the texture map at four sets of coordinates surrounding the center of each pixel, and then uses the fractional portion in a process to weight the texture values (texels) in the texture map at the positions surrounding the central point. The weighted portions of what are typically the four closest texture values are combined and blended using their assigned weights into a more accurate representation for modifying the pixel color values to reproduce the texture pattern. Thus, each pixel is assigned a texture value from a combination of the texture values of the texels within the projection of that pixel on the texture map.

Figure 5:
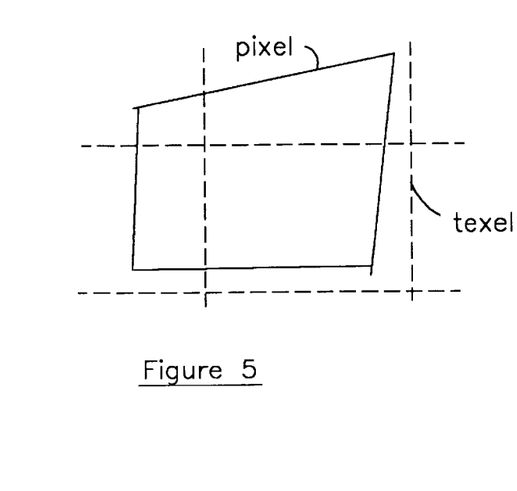
FIG. 5 is another enlargement of a portion of the texture map illustrated in FIG. 3 demonstrating pixel size versus texel size.
Figure 6:
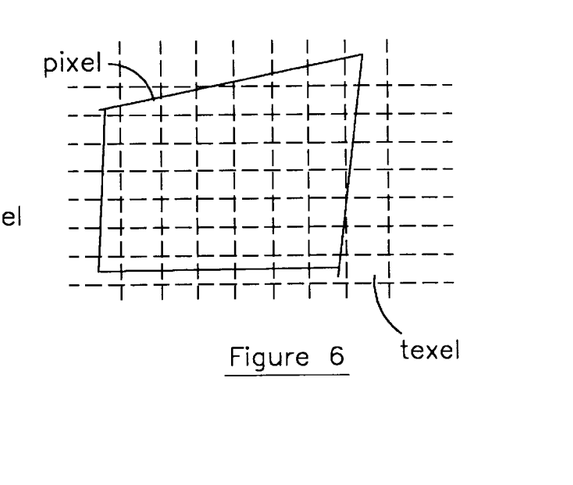
FIG. 6 is yet another enlargement of a portion of the texture map illustrated in FIG. 3 also demonstrating pixel size versus texel size.

Those skilled in the art will recognize that neither of these methods provides an accurate textural representation unless the size of the pixels rendered and the scale of the texture map used are related in a manner that a pixel covers a minimum number of texture values. FIG. 5 illustrates a mapping in which each projected pixel (solid line) covers some portion of four adjacent texels. If bilinear interpolation of the four surrounding texels is used to derive a texture value to be applied to modify the color of a pixel, then the representation of the texture is likely to be reasonably accurate. On the other hand, FIG. 6 illustrates a mapping in which each projected pixel covers a very large number of texels. If bilinear interpolation of the four surrounding texels is used to derive a texture value to be applied to a pixel, then the representation of the texture may not be very accurate at all since a large number of texel values which fall within the projected pixel are not used to determine the final texture value.

To correct for this problem, a technique called "mipmapping" has been used. Mipmapping provides a plurality of texture maps representing the same texture at a number of different scales. For instance, scales might vary from 256× 256 to 1×1. By selecting a scale appropriate to the method of selection and to the number of pixels in a triangle 13a, a more appropriate assignment of texture values to pixels may be made. Thus, a texture map of a scale in which a number of texels is covered by a somewhat similar number of projected pixels (such as in FIG. 5) may be assigned to a particular triangle 13a and can provide a more accurate texture representation. It will be recognized that a texture map having a smaller number of texels will in such a case be used for applying texture to a triangle which occupies only a small number of pixels on the screen.

Each of these methods functions well in some circumstances. However, all of these methods are based on the construction of a rectilinear texture map accessed in rows and columns and a generally rectilinear pixel shape. The interpolation of values surrounding an index point reached by u and v coordinates is similarly based on assessing values provided from the rectilinearly organized texture map provided in the four positions closest to the pixel center generally at right angles to one another. This tends to provide accurate representations of textures (assuming a proper scale) when the pixels being rendered describe a textured surface which lies in a plane parallel to the surface of the screen so that an essentially rectangular pixel represents a rectangular portion of a texture map. However, as noted above, if the z values of the vertices of the triangle 13a differ, then the triangle is rendered on the screen in perspective.

This means that a texture described on the surface of the triangle will similarly appear in perspective. This texture representation does not occur correctly with any of the methods for texture mapping known to the prior art.

Figure 7:
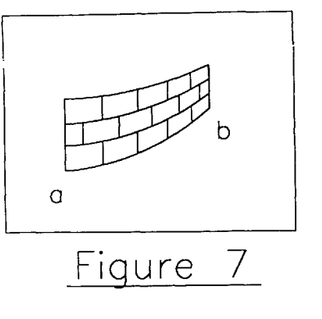
FIG. 7 illustrates a particular three dimensional shape which is to be displayed on a computer output display.

FIG. 7 illustrates a surface with a brick texture applied which appears in perspective. As may be seen, each of the individual bricks in the texture is warped and distorted as compared to the rectangular shape of the bricks in the texture map illustrated in FIG. 4. It should be noted that shapes appearing in perspective constitutes the case most often encountered in rendering.

Figure 8:
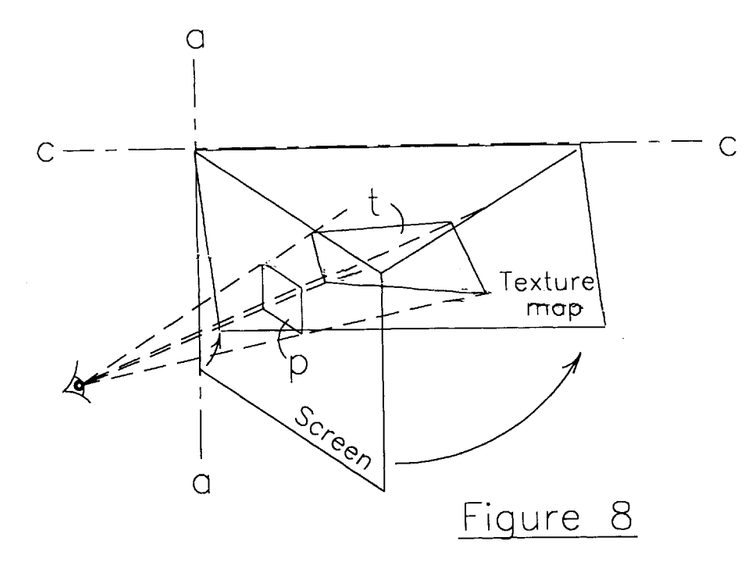
FIG. 8 illustrates the projection of a single pixel onto a texture map.

FIG. 8 illustrates how a single pixel is projected onto a texture map. Visualizing the manner in which this occurs will help in understanding the method of the present invention to determine texture values. In FIG. 8, the surface to which the texture is mapped is rotated back from the screen surface about an axis a—a at the left edge of the screen and is also rotated back on a second axis c—c. A series of lines from the viewing position of a user through the corners of an enlarged pixel p perpendicular to the screen surface intersect the surface and the texture map in an distorted shape t. It is the texture values within the pixel shape t which determine the ultimate texture value which should be used to modify the color values of the pixel p on the screen surface.

A much more complicated method for selecting the scale of texture map to be used in mapping texture values to polygons obviates the problem caused by perspective in rendering to the screen. Rather than utilize methods which rely only on rectilinear processing, the method compares actual changes in texture map coordinates to the changes in screen coordinates for each triangle or pixel in order to obtain a more accurate scaling of the pixels onto the texture map.

This is accomplished by comparing the change in u and v coordinates to the change in x and y coordinates in each of four directions along the projected x-y axes of pixels projected onto the texture map. In FIG. 8, it may be seen that for a change of one pixel in each of the x and y directions on the screen surface the u and v positions change in a manner which depends on the relation of the texture map to the surface of the screen. The comparison of the u and v texel distances with the x and y pixel distances allows the selection of a texture map having a scale which positions the pixel at the correct scale with respect to the texel size as discussed.

Figure 9:
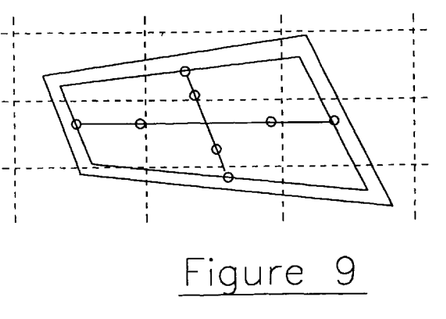
FIG. 9 is another view illustrating the projected pixel of FIG. 8.
Figure 10:
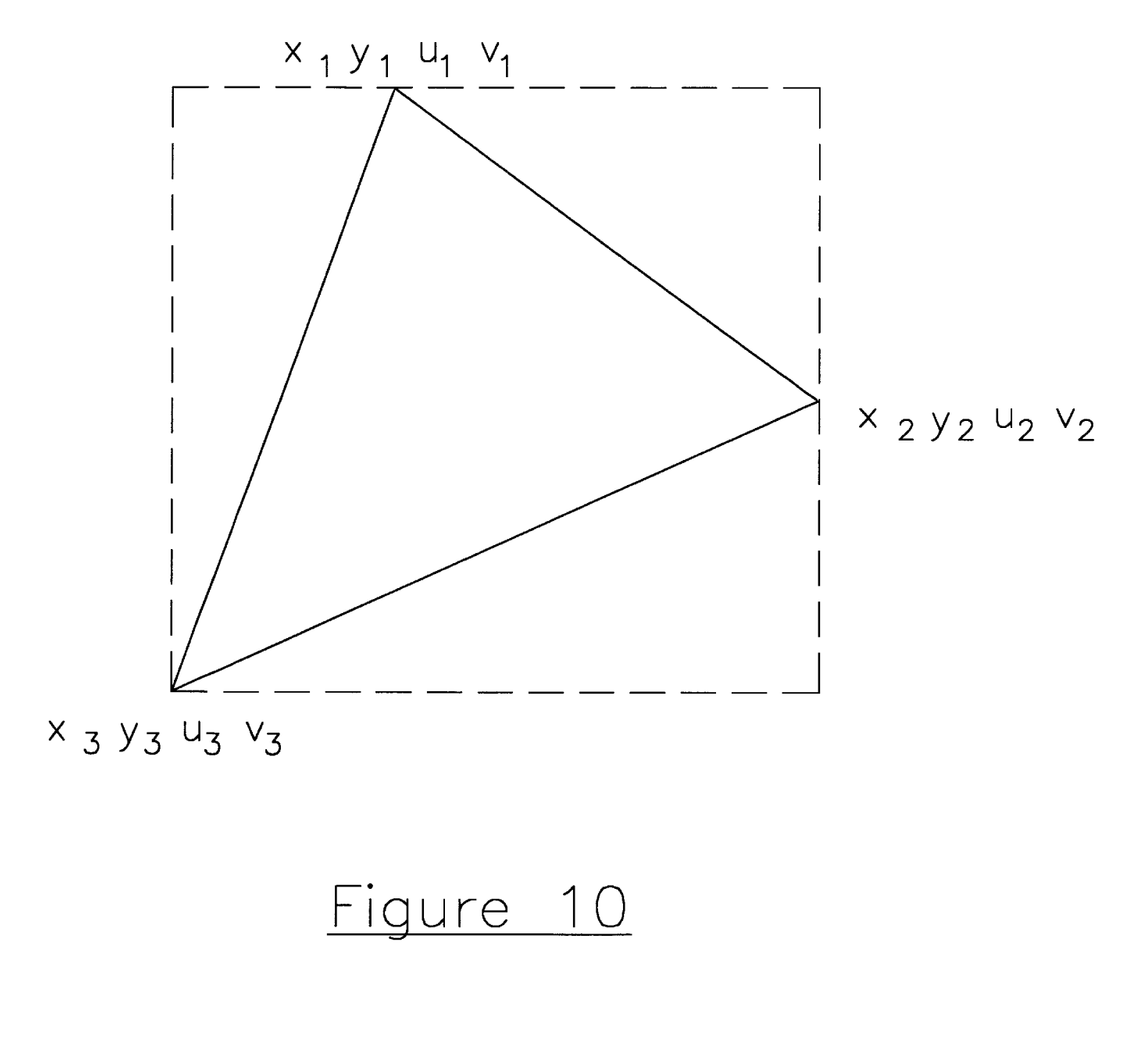
FIG. 10 is an illustration useful in understanding the processes of the present invention.

These changes of u and v with respect to x and y along the x and y axes of the pixel projected onto the texture map from the mapped center of the pixel allow the accurate measurement of pixel size relative to texel size in the texture space. By determining the projected position of the pixel, the distortion that occurs to the pixel when its regular shape on the screen surface (square, rectangular, or oval) is projected onto a texture surface is removed from the scale computation. The projected pixel is illustrated in FIG. 9 for the enlarged pixel of FIG. 8. As may be seen, the projection of the pixel onto a texture map provides the basis for a much more realistic assessment of texture scale necessary to provide accurate texture mapping.

In order to accomplish the method of this invention, the x, y, and y world space coordinates and the u and v texture map coordinates of a triangle are used to generate the x, y, and z screen space coordinates and the u and v texture map coordinates of each pixel in one of the manners described. The size of the texels as determined from the u and v coordinates with respect to the size of the pixels as determined from x, y, z coordinates is used to select a texture map of the correct scale. With a texture map of the correct scale, the changes of the u and v coordinates with respect to the x and y coordinates along the selected projected axes on the texture map may be determined.

As will be understood, determining the change of dimensions in the texture map with respect to the change in the dimensions of pixels is the most accurate method which can be used to determine the scale to be used for a texture map as well as to determine texture values. Such a process is typically a compute-intensive operation which may slow the operation of generating pixels for the frame buffer. It is possible to formulate algorithms utilizing the partial derivatives of the u and v coordinates with respect to the x and y coordinates to accomplish this. In order to accomplish the operations required within acceptable times, it is necessary to utilize very large amounts of circuitry. Such circuitry increases the cost of a system to the point that it is unreasonable except for highly sophisticated operations such as professional graphics design.

The present invention provides a new technique for obtaining the change of dimensions in the texture map with respect to the change in the dimensions of pixels. This new method provides for much faster manipulation of the texture coordinates to obtain texture values and thereby eliminates the need for complicated and expensive circuitry in the graphic accelerator. The method allows the very accurate method to be used in inexpensive computers available to the ordinary user.

The present invention uses a number of different processes to provide a solutions to the problem. Each of these processes utilizes bounding boxes for assessing the dimensions of a triangle (or a pixel) in screen space and of texels in world space.

In one embodiment, the maximum change in the u and v coordinates is determined using such a bounding box. A bounding box for the triangle in world space is described by the smallest and the largest u coordinates and the smallest and largest v coordinates of the triangle. Similarly, a bounding box for the triangle in screen space is described by the smallest and the largest x coordinates and the smallest and largest y coordinates of the triangle in screen space. The largest change in either of the u or the v coordinates is compared to the largest change of either the x or the y dimensions. The comparison of these values produces a scale for the texture map to be used for mapping a particular triangle to a texture.

Using the dimensions of the triangle averages changes over the triangle and is not precise where the perspective is significant. However, using pixel and texel dimensions from adjacent pixels and texels provides much more accurate scaling where perspective is great.

A second process utilizes the minimum change in u and v coordinates determined using such bounding boxes from the coordinates of the triangle in texture space and screen space. The smallest of the u or v coordinates is compared to the smallest of the x and y dimensions. The comparison of these values produces a scale for the texture map to be used for mapping a particular triangle to texture space.

The difference between these two methods is that the comparison of maximum changes in coordinates in world and screen space maximums tends to provide a more conservative answer than does the comparison of minimum changes.

A third process compares the area of the projected triangle (or pixel) in world space to the area of the triangle (or pixel) in screen space in order to determine a scale for the texture map to be used. This comparison produces a relatively more accurate result than either of the first two methods but does require additional computation and therefore slows the process somewhat.

A much more rapid process for determining the change in texture space with respect to screen space which still provides a scaling which is very accurate utilizes the sum of two adjacent sides of a bounding box in world space and the sum of two adjacent sides of a bounding box in screen space. These dimensions may be very rapidly and accurately obtained and combined from the vertices provided to obtain the values to be compared. The division of the two values produces an accurate scale. In one modification of the process, logarithmic values of the summed dimensions are used and subtracted to eliminate the step of division and provide an even more rapid process.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A method for determining a scale for a texture map to be mapped to a three dimensional surface defined by one or more polygons comprising the steps of:

determining two dimensional screen coordinates of pixels defining a first polygon in screen space from three dimensional world space coordinates of vertices of a corresponding second polygon in world space determining the smallest and the largest two dimensional screen coordinates of some portion of the first polygon to provide a first bounding box, determining the smallest and the largest world space texture coordinates of a portion of the second polygon to provide a second bounding box, and comparing the sides of the first and second bounding boxes and using the ratio thereof to determine a scale for a texture map used to accurately reproduce the texture values for at least some of the pixels of said first polygon.

2. A method as claimed in claim 1 in which a smallest side of the first bounding box and a smallest side of the second bounding box are compared to determine the scale for the texture map.

3. A method as claimed in claim 1 in which a product of two adjacent sides of the first bounding box and a product of two adjacent sides of the second bounding box are compared to determine the scale for the texture map.

4. A method as claimed in claim 1 in which a sum of two adjacent sides of the first bounding box and a sum of two adjacent sides of the second bounding box are compared to determine the scale for the texture map.

5. A method as claimed in claim 1 in which the portion of the polygon is the entire polygon.

6. A method as claimed in claim 1 in which the portion of the polygon is the entire polygon.

7. A method as claimed in claim 6 in which a smallest side of the first bounding box and the smallest side of the second bounding box are compared to determine the scale for the texture map.

8. A method as claimed in claim 6 in which a product of two adjacent sides of the first bounding box and a product of two adjacent sides of the second bounding box are compared to determine the scale for the texture map.

9. A method as claimed in claim 6 in which a sum of two adjacent sides of the first bounding box and a sum of two adjacent sides of the second bounding box are compared to determined the scale for the texture map.

10. A method as claimed in claim 6 in which the sums are expressed logarithmically to eliminate a division in the comparison to obtain the scale for the texture map.

11. A method as claimed in claim 1 in which the portion of the polygon is a pixel.

12. A method as claimed in claim 11 in which a smallest side of the first bounding box and a smallest side of the second bounding box are compared to determine the scale for the texture map.

13. A method as claimed in claim 11 in which a product of two adjacent sides of the first bounding box and a product of two adjacent sides of the second bounding box are compared to determine the scale for the texture map.

14. A method as claimed in claim 11 in which a sum of two adjacent sides of the first bounding box and a sum of two adjacent sides of the second bounding box are compared to determine the scale for the texture map.

15. A method as claimed in claim 11 in which the sums are expressed logarithmically to eliminate a division in the comparison to obtain the scale for the texture map.

* * * * *